United States Patent [19]

Matumoto et al.

[11] Patent Number: 5,052,768
[45] Date of Patent: Oct. 1, 1991

[54] DEVICE FOR RETAINING WIRE-LIKE OPTICAL WAVE-GUIDE

[75] Inventors: Syuji Matumoto, Tokyo; Yasumasa Koakutsu, Fujisawa, both of Japan

[73] Assignees: Hitachi, Ltd., Tokyo; Shinkogiken, Ltd., Kanagawa, both of Japan

[21] Appl. No.: 506,819

[22] Filed: Apr. 10, 1990

[30] Foreign Application Priority Data

Apr. 13, 1989 [JP] Japan .................................. 01-091915
Nov. 13, 1989 [JP] Japan .................................. 01-292370

[51] Int. Cl.5 .................................................. G02B 6/36
[52] U.S. Cl. .......................................... 385/76; 385/136
[58] Field of Search .................. 350/96.2, 96.21, 96.22, 350/96.23

[56] References Cited

U.S. PATENT DOCUMENTS 3,946,467  3/1976  Lukas et al. ............... 350/96.2 X
4,781,430  11/1988  Tanaka ....................... 350/96.2

Primary Examiner—John D. Lee
Attorney, Agent, or Firm—Antonelli, Terry, Stout & Kraus

[57] ABSTRACT

A device for retaining a wire-like optical wave-guide for an optical connector includes a cylindrical plug made of an elastic material for gripping the outer peripheral surfaces of a wire-like optical wave-guide with at least one end portion of the plug, having a predetermined length, being divided into a plurality of portions in a circumferential direction. The cylindrical plug has an expanded form in which a distance from an axis of the plug to each of the divided portions gradually increases toward the one end of the plug, with a tightening member pressing a vicinity of a free end of the cylindrical plug, which is in a state where the wire-like optical wave-guide is passed through the plug along the axis of the plug so as to allow the wire-like optical wave-guide to be retained by the cylindrical plug, in a direction substantially perpendicular to the axis of the plug from the outside of the plug. The tightening member deforms the divided portions and causes a retaining force to be applied to the optical fiber in a proximal end of the divided portions spaced from the pressing portion.

10 Claims, 4 Drawing Sheets

DEVICE FOR RETAINING WIRE-LIKE OPTICAL WAVE-GUIDE

BACKGROUND OF THE INVENTION

The present invention relates to a device for retaining a wire-like optical wave-guide of an optical connector or the like.

Optical connectors are used at many places in optical telecommunication systems where detachable optical connection is required, such as switch-over of equipment, removal or reception transmission boards or adjustment of devices. The optical connector basically includes a sleeve or housing coaxially fitted onto the outer periphery of a wire-like optical wave-guide (e.g., an optical fiber) consisting of a core and a clad to form a first plug having a sufficiently large diameter which ensures easy handling, and another plug with a tightening fastener is then mounted on the outer periphery of the first plug. A pair of thus-obtained assemblies are coupled with each other utilizing the above-described another plugs. Alignment and coupling of the two plugs is achieved by using a receptacle with a split sleeve or a collet chuck to align a plug.

Various types of "wire-like optical wave-guide retaining devices" for use in an optical connector are known. Examples of such devices include a wire-like optical wave-guide fixed by an adhesive, and a wire-like optical wave-guide fixed by caulking.

In such retaining devices which employ the above-described conventional fixing techniques, although reliable fixing of the wire-like optical wave-guide is provided, a difference in the rate at which the optical wave-guide and the retaining member are expanded or contracted when the temperature changes, caused by a difference in coefficient of thermal expansion between the wire-like optical wave-guide and the optical wave-guide retaining member, or variations in the dimensions of the components cannot be absorbed. Consequently, an excess stress may be generated in the components of the retaining device, particularly, in the wire-like optical wave-guide, thus shortening the life of the wave-like optical wave-guide.

Furthermore, in the retaining devices employing the above-described conventional fixing techniques, if the retaining device does not conform to predetermined standards as determined by an inspection following assembly, it is impossible to disassemble the device to replace any nonconforming component. Consequently, the output is low, and production is very uneconomical.

In the case of the retaining device which employs an adhesive to fix the optical wave-guide, it takes some time for the adhesive to dry thereby lowering the productivity. Furthermore, hardening of the adhesive may shift the position of the wire-like optical wave-guide.

If a caulking is employed, when the amount of caulking force exceeds a predetermined magnitude, the wire-like optical wave-guide is broken, and, consequently, it is necessary to strictly control the application of the caulking force.

SUMMARY OF THE INVENTION

An object of the present invention is to provide a device for retaining a wire-like optical wave-guide which allows no excess stress to be applied to the wire-like optical wave-guide resulting from environmental changes such as temperature or dimensional variations in the components.

Another object of the present invention is to provide a device for retaining a wire-like optical wave-guide which provides easy assembly and improved productivity, which can be disassembled and reassembled, after an inspection test has been conducted on an assembly, and which therefore allows production cost to be reduced.

To this end, the present invention provides a device for retaining a wire-like optical wave-guide which comprises a cylindrical plug made of an elastic material for gripping the outer peripheral surface of at least one wire-like optical wave-guide, with at least one end portion of the plug, having a predetermined length, being divided into a plurality of portions on the circumference. The divided portions have an expanded form in which a distance from an axis of the plug to each of the divided portions increases toward the one end, i.e., a free end, of the plug. A tightening member presses a vicinity of the free ends of the cylindrical plug, which is in a state where the wire-like optical wave-guide is passed through the plug along the axis of the plug so as to allow the wire-like optical wave-guide to be retained by the cylindrical plug, in a direction substantially perpendicular to the axis of the plug from the outside of the plug and deforms the divided portions thereby causing a retaining force to be applied to the wire-like optical wave-guide in a proximal end or a gripping portion of the divided portions having the expanded form, which is separated from a pressing portion.

In a typical expanded form, according to the present invention, the divided portions of the cylindrical plug have the same wall thickness in the axial direction of the plug, and the inner and outer surfaces of the divided portions are inclined such that they gradually separate from the axis as they approach the one end, i.e., a free end thereof. In this form, the inner and outer diameters of the divided portions are generally a maximum diameter at the free end thereof. In another example of the expanded form, the outer diameter of the divided portions remains the same in the axial direction of the cylindrical plug while the inner diameter is larger, i.e., the wall thickness is smaller, than that of the remaining portion, over a predetermined length of the plug from the one end, i.e., from the free end thereof. In that case, the inner diameter may be gradually increased or may be increased uniformly over the predetermined range from the free end, as they approach the free end. In still another example of the expanded form, the outer surface of the divided portions is gradually separated from the axis toward the one end, i.e., a free end, and the inner surface of the divided portions is formed in the same manner as that of the second example. In the first example, the inner surface of the divided portions is inclined such that it is gradually separated from the axis of the plug toward the free end thereof. The angle at which the inner surface is inclined is referred to as an expansion angle. In the other two examples, the inner surface of the divided portions is not always inclined. Thus, a magnitude of the expansion angle is defined by a difference between the inner diameter of the portion having a large wall thickness which is remote from the free end and the inner diameter of the portion having a small wall thickness which is close to the free end. In other words, the larger the difference, the larger the expansion angle, and the smaller the difference, the smaller the expansion angle.

The vicinity of the free end of the divided portions of the cylindrical plug which are shaped in an expanded form is pressed from the outside thereof by the tightening member and is thereby deformed, by which the other portion to the divided portions which is separated from the pressing portion and which is the proximal end or the gripping portion of the divided portions is pressed against the surface of the wire-like optical wave-guide so as to allow the wire-like optical wave-guide to be reliably retained. According to the present invention, since the point at which the pressing force is applied to the divided portions is separated from the point at which the retaining force of the divided portion acts on the wire-like optical wave-guide in the axial direction of the cylindrical plug, the pressing force applied to the divided portion acts on the wire-like optical wave-guide in the form of an elastic force of the divided portions which serve as cushioning members. The magnitude of the retaining force applied to the wire-like optical wave-guide is determined by the initial expansion angle of the divided portions because, as the initial expansion angle of the divided portions increases, the degree at which the free end of the divided portions is deformed by the tightening member increases, thereby increasing the pressure exerted on the wire-like optical wave-guide by the divided portions, i.e., the retaining force This means that the retaining force applied to the wire-like optical wave-guide can be adequately determined by suitably selecting the initial expansion angle of the divided portions.

In this invention, even if there exists a difference in the rate at which the components of the retaining device and the wire-like optical wave-guide are expanded or contracted when the temperature changes, or even if there exist variations in the dimensions of the components of the retaining device and the optical wave-guide, the difference in the expansion or contraction rate or the variations in the dimensions is absorbed by the portion of the elastic divided portions which is located between the point of application of pressing force and the point of action, and generation of excessive stress in the wire-like optical wave-guide or damage of the wire-like optical wave-guide can be thereby eliminated.

Furthermore, the retaining device can be easily disassembled by removing the pressing force exerted on the cylindrical plug by the tightening member, and the separate components can be reassembled to form the retaining device. Consequently, the yield can be increased, and the production cost can be reduced.

The cylindrical plug may be formed of any elastic material, such as brass, stainless steel (JIS SUS 304), an engineering plastic or a fiber reinforced resin.

The above and further objects and features of the present invention will become apparent from the following description taken in connection with the accompanying drawings.

DESCRIPTION OF THE PREFERRED EMBODIMENTS

Figure 4:
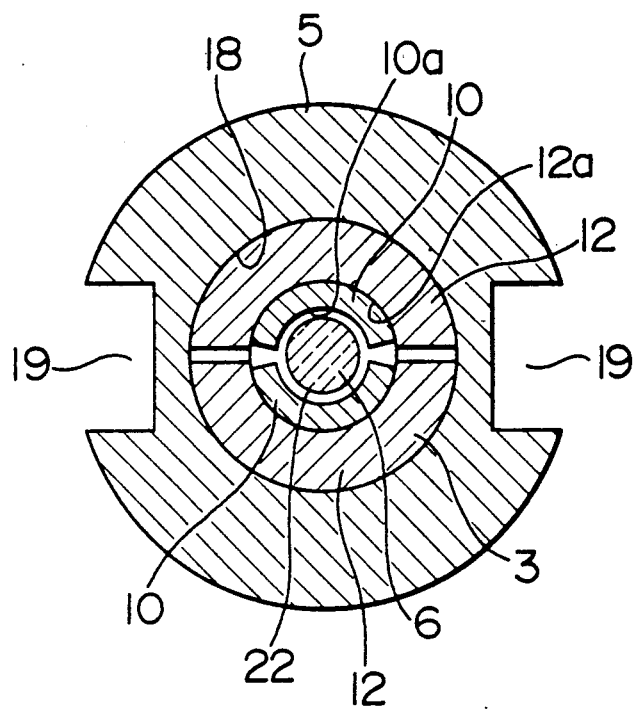
FIG. 4 is a section taken along the line 4—4 of FIG. 3.
Figure 5:
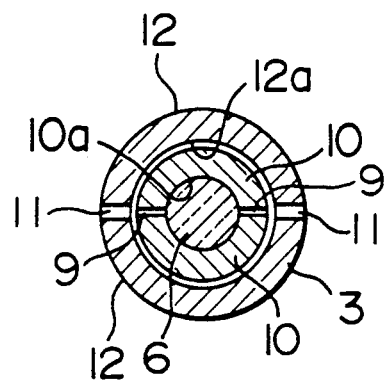
FIG. 5 is a section taken along the line 5—5 of FIG. 3.

Referring now to the drawings wherein like reference numerals are used throughout the various views to designate like parts and, more particularly, to FIG. 1, according to this figure, a device for retaining a wire-like optical wave-guide (hereinafter referred to as an optical fiber) includes an optical fiber guide tube 1, a cylindrical plug 2 made of a relatively soft elastic material, a cylindrical tightening member 3, a jacket retaining tube 4, and a pressurizing ring 5. The optical fiber guide tube 1 is open at one end and has an end wall 7 at an opposite end thereof. An opening 7a having the same diameter as the outer diameter of an optical fiber 6 is formed in the end wall 7. The optical fiber guide tube 1 may be formed of 18 Cr-8Ni stainless steel (JIS SUS 304), zirconia or a resin and have an outer diameter of 1.25 mm, 2.0 mm or 2.5 mm. The cylindrical plug 2 is formed of a relatively soft material such as copper or a copper alloy. A left half of the cylindrical plug 2 as viewed in FIG. 1, forms a base portion 8 having a peripheral wall continuous in the circumferential direction. A right half of the cylindrical plug 2 has two cuts 9 which extend along the axis of the plug 2 from the right end thereof through a predetermined length and which thereby divide the cylindrical plug 2 into a pair of opposed elastic portions 10 along the axial direction thereof. The elastic portions 10 of the cylindrical plug 2 have an expanded form. Each of the portions 10 has a groove 10a on its inner surface at the center thereof and extending over the entire length of the portion 10 (FIGS. 4 and 5). In this embodiment, the right half of the cylindrical plug 2 has two cuts 9. However, it may have more than two cuts. The same thing applies to a cut 11, which will be described later.

Figure 1:
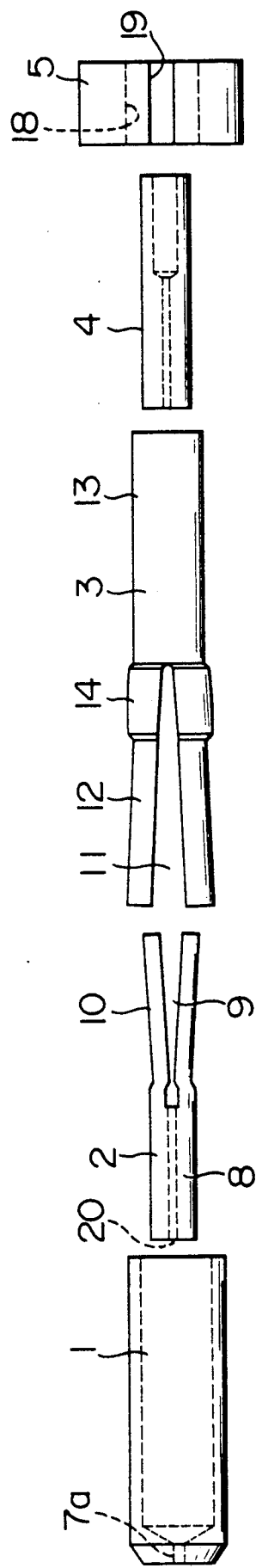
FIG. 1 is an exploded side elevational view of a first embodiment of a wire-like optical wave-guide retaining device according to the present invention.

In contrast to the plug 2, the tightening member 3 has two cuts 11 on a left half thereof which extend along the axis thereof from its left end through a predetermined length and which thereby divide the left half portion into a pair of opposed portions 12 in the circumferential direction, as shown in FIG. 1. The opposed portions 12 are expanded at the open end thereof. The right half of the tightening member 3 forms a base portion 13 having a peripheral wall which is continuous in the circumferential direction. The tightening member 3 has a protrusion 14 on the outer peripheral surface of the portion thereof which is the end portions, in the vicinity of the base portion 13, of the divided portions 12. The protrusion 14 is substantially annular excluding the cuts 11. Each of the portions 12 has a groove 12a on its inner surface at the center thereof. The groove 12a extends over the entire length of the portion 12 (FIGS. 4 and 5).

Figure 2:
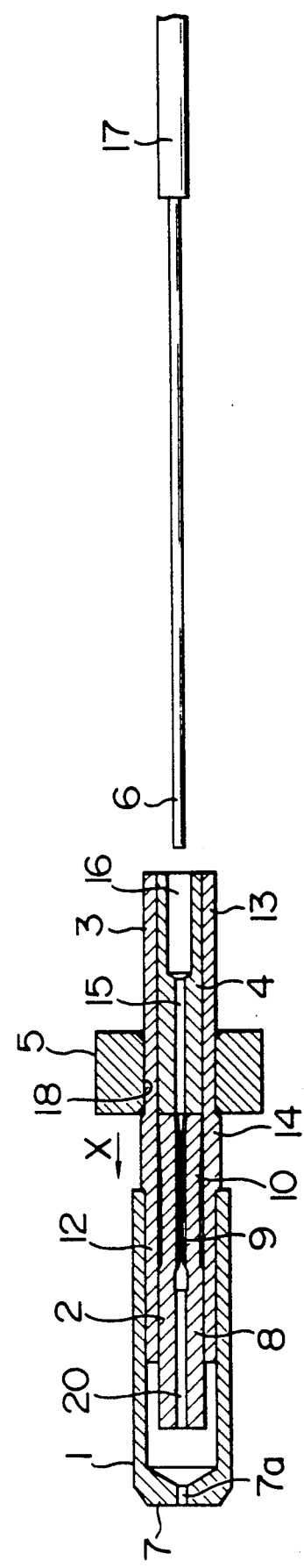
FIG. 2 is a cross-sectional view of the retaining device of FIG. 1, showing an assembly process.

The jacket retaining tube 4 has a small-diameter center hole 15 having the same dimension as the outer diameter of the optical fiber 6, and a large-diameter center hole 16 having the same dimension as the outer diameter of a jacket 17 which covers the optical fiber 6, as shown in FIG. 2. The small-diameter center hole 15 and the large-diameter center hole 16 continue in the longitudinal direction of the jacket retaining tube 4 and thereby form a through-hole which passes the tube 4 along the axis thereof. The pressurizing ring 5 has an opening 18 at the central portion thereof which passes the ring 5 along the axis thereof. The opening 18 has an inner diameter which is smaller than the outer diameter of the protrusion 14 of the tightening member 3. The pressurizing ring 5 has at least one positioning groove 19 on its outer peripheral surface. The positioning groove 19 is used to align the optical axis of the optical fiber to that of an optical fiber which is retained by an opposite optical connector.

To assemble the retaining device, the divided portions 10 of the plug 2 are first inserted into a hollow portion of the tightening member 3 in a state where the cuts 9 oppose the corresponding cuts 11, as shown in FIG. 1. Next, the forward end portion of the tightening member 3 with the portions 10 inserted therein is inserted into the hollow portion of the optical fiber guide tube 1 until the protrusion 14 contacts the open end of the optical fiber guide tube 1. Subsequently, the jacket retaining tube 4 is inserted into a central hole formed in the base portion 13 of the tightening member 3, and the pressurizing ring 5 is then fitted onto the outer periphery of the base portion 13 at a position where the end of the pressurizing ring 5 is in contact with the protrusion 14.

Thus, the optical fiber guide tube 1, the plug 2, the tightening member 3, the jacket retaining tube 4 and the pressurizing ring 5 are put together to form an assembly.

Next, in this state, the optical fiber 6 excluding part of the jacket 17 thereof is passed first through the large-diameter center hole 16 of the jacket retaining tube 4, the small diameter center hole 15, a central hole 20 of the plug 2 then through the opening 7a of the end wall 7 until the forward end portion of the optical fiber 6 protrudes from the optical fiber guide tube 1 and part of the jacket 17 is placed within the large-diameter center hole 16 of the jacket retaining tube 4, as shown in FIG. 2.

Figure 6:
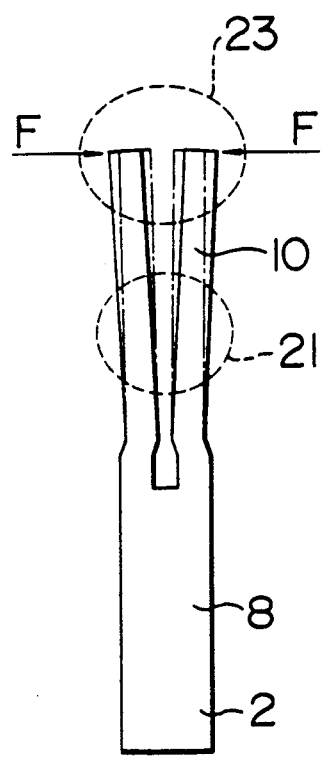
FIG. 6 explains the wire-like optical wave-guide retaining principle.

Thereafter, the pressurizing ring 5 is forcibly moved in the direction indicated by the arrow X in FIG. 2 and fitted onto the protrusion 14. As stated above, the portions 12 initially have an expanded form. Consequently, the forced movement of the pressurizing ring 5 presses the portions 12 inwardly. As shown in FIG. 6, when the pressing force F is applied perpendicular to the axis of the plug 2, the free end portions of the divided portions 10 are pressed toward the axis of the plug 2. This causes the gripping portion 21 of the divided portions 10 which is close to the base portion to elastically grip the periphery of the optical fiber 6. FIG. 5 shows a state in which the substantially overall periphery of the optical fiber 6 is firmly gripped by the elastic portions 10. The free end portions of the divided portions 10 are not in contact with the optical fiber 6, as shown in FIG. 4. They are separated from the optical fiber 6 by a gap 22. Thus, the gripping portion 21 of the divided portions 10 (a point of gripping action) and a pressing portion 23 (a point of application of force) are separated by a predetermined distance in the axial direction of the optical fiber 6, that is, the pressing portion 23 is not equal to the gripping portion 21.

Figure 5A:
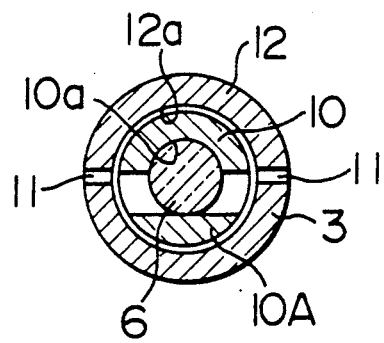
FIG. 5A is a cross-sectional view a modification of a cylindrical plug, and corresponds to FIG. 5.

FIG. 5A shows another examples of the divided portions 10 and 10A. In this example, only one divided portion 10 in the pair of divided portions has a groove 10a.

Figure 3:
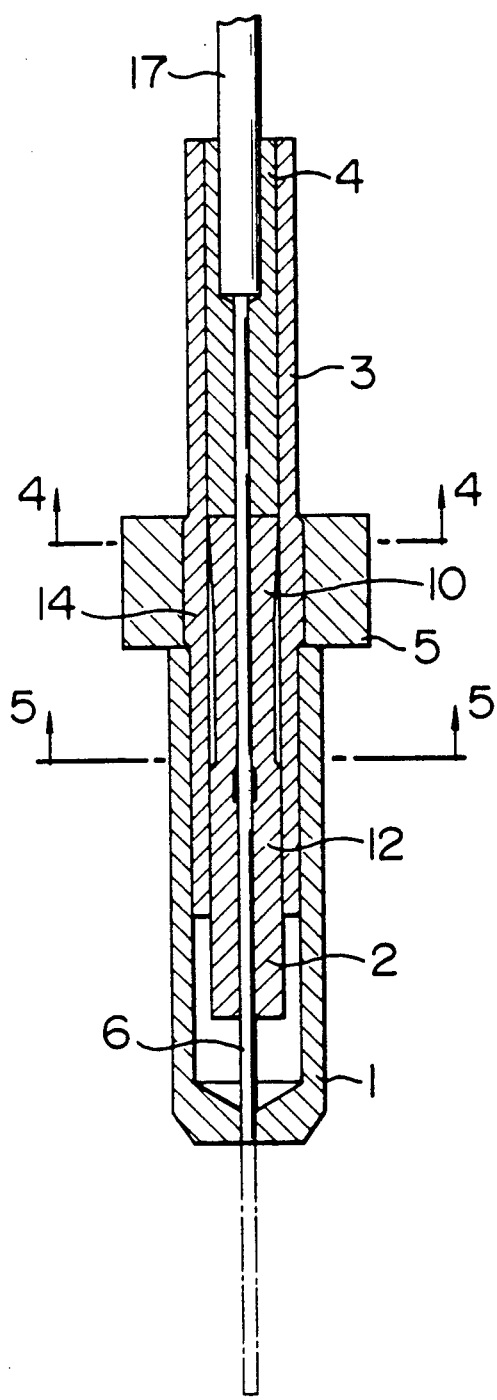
FIG. 3 is a cross-sectional view of the retaining device in an assembled state.

After the optical fiber 6 has been retained in the above-described manner, the forward end portion (shown by the dot-dashed line in FIG. 3) of the optical fiber 6 protruding from the optical fiber guide tube 1 is cut or polished to align the optical fiber 5 to the forward end surface of the optical fiber guide tube 1, thereby completing assembly of a ferrule type optical connector.

In this embodiment, the pressurizing ring 5 is forcibly fitted onto the outer periphery of the tightening member 3 to impart a pressing force to the plug 2 through the tightening member 3. However, the optical fiber guide tube 1 may be arranged such that it has the function of the pressuring ring 5.

Figure 7:
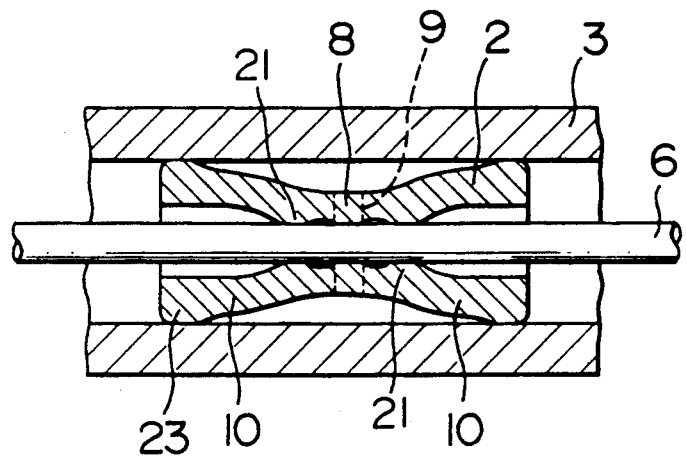
FIG. 7 is an enlarged cross-sectional view of the essential parts of the wire-like optical wave-guide retaining device, showing a second embodiment of the present invention.

In the embodiment of FIG. 7, the cylindrical plug 2, made of an elastic material, has a base portion 8 at a center thereof, and a plurality of divided portions 10 on the two sides of the base portion 8. When the cylindrical tightening member 3 is forcibly fitted onto the outer periphery of the plug 2, the pressing force is received by the pressing portion 23, by which the optical fiber 6 is elastically gripped by the gripping portion 21. In the embodiment of FIG. 7, the gripping portion 21 and the pressing portion 23 are separated from each other along the axis of the optical fiber 6, as in the case of the embodiment of FIGS. 1–6. It will be also understood that a modified plug, being divided into a plurality of portions over the entire length thereof without base ring-like portion such as the portion 8, can be adopted by those skilled in the art, maintaining the same function as the plug 2.

Figure 8:
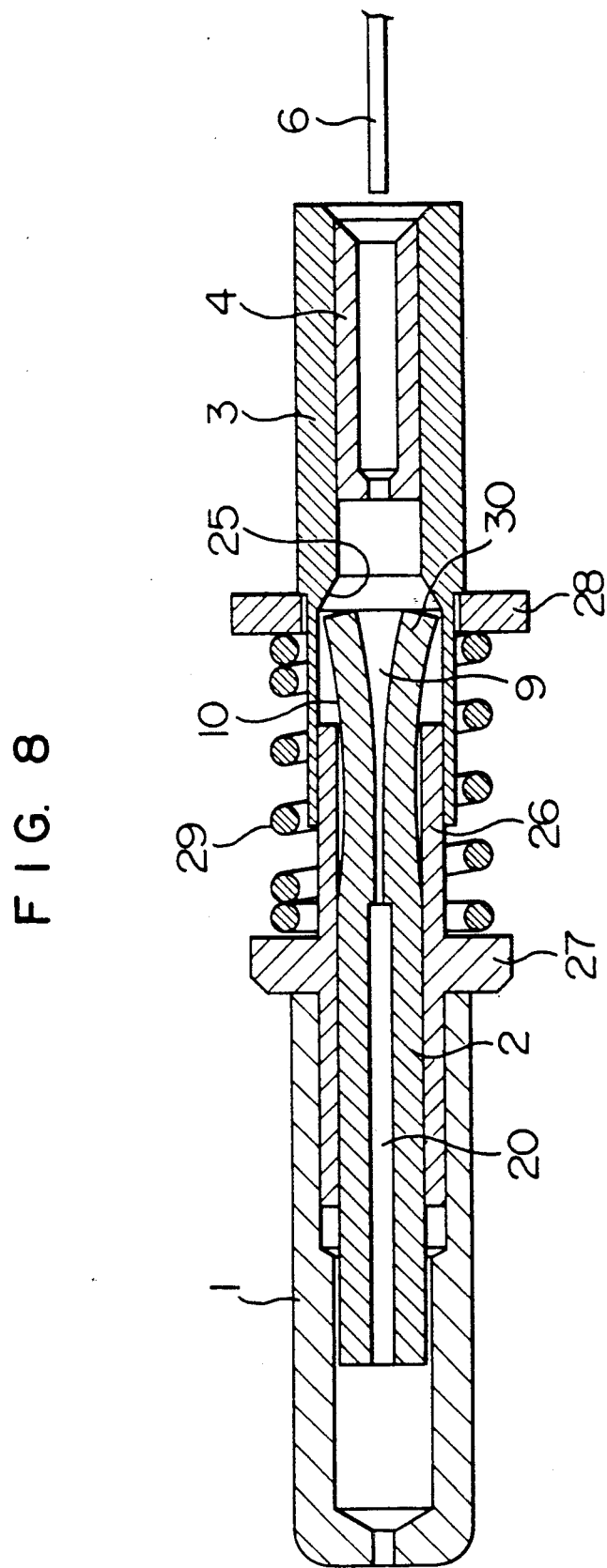
FIG. 8 is an enlarged cross-sectional view of parts of the wire-like optical wave-guide retaining device, showing a third embodiment of the present invention.

In the embodiment of FIG. 8, the tightening member 3 has no cuts and thus has a cylindrical shape. The tightening member 3 has a shoulder 25 on its inner peripheral surface at the substantially central position thereof in the longitudinal direction, with the shoulder 25 being inclined inwardly in the radial direction.

A cylindrical holder 26 is interposed between the optical fiber guide tube 1 and the plug 2. The cylindrical holder 26 has a collar 27 on its outer periphery at a substantially central position. A washer 28 is fitted onto the outer periphery of the tightening member 3 at a position in contact with a stopper shoulder formed on the outer periphery of the tightening member 3. Between the washer 28 and the collar 27 is interposed a compression coil spring 29.

FIG. 8 shows a state in which the wire-like optical wave-guide retaining device is being assembled. The spring 29 is not yet compressed, and the bifurcated forward end portion 30 of the plug 2 is opposed to the inclined shoulder 25 of the tightening member 3.

In this state, the optical fiber 6 is inserted into the central hole 20 of the plug 2, and the tightening member 3 is then forcibly moved toward the holder 26 against the elastic force of the spring 29. This causes the forward end portions 30 of the plug 3 to ride on the inclined shoulder 25 of the tightening member 3. As a result, a strong gripping force is generated in the pair of portions 10 which are expanded toward the open ends thereof, and reliable retaining of the optical fiber 6 is thereby ensured.

As will be understood from the foregoing description, since the gripping portion (the point of gripping action) of the divided portions which retain the wire-like optical wave-guide and the pressing portion (the point of application of force) are separated from each other in the axial direction of the plug, a difference in the coefficient of thermal expansion between the wire-like optical wave-guide and the plug or variations in the dimensions in the radial direction can be absorbed, and no undesired stress is generated.

When an inspection test reveals that the completed retaining assembly does not conform to the desired standard, the retaining assembly can be disassembled into components without damage by removing the tightening member or the like and thereby removing the pressing or tightening force, with the disassembled components then being reassembled. Consequently, the yield is increased, and production cost is reduced.

What is claimed is:

1. A device for retaining a wire-like optical wave-guide, the device comprising:
    a cylindrical plug of an elastic material for gripping an outer peripheral surface of at least one wire-like optical wave-guide, at least one end portion of said cylindrical plug being divided into a plurality of portions over a predetermined length of said end portion along a circumference of said cylindrical plug, said divided portions expanding outwardly in such a manner that a distance from a longitudinal center axis of said cylindrical plug to each of the divided portions increases in a direction toward a free end of said cylindrical plug; and
    a tightening member for applying a pressing force in a vicinity of said free end of said cylindrical plug when the wire-like optical wave-guide extends through said cylindrical plug along the longitudinal center axis of said cylindrical plug in a direction substantially perpendicular to the longitudinal center axis of said cylindrical plug from an outside of the cylindrical plug so as to deform said divided portions and cause a retaining force to be applied to the wire-like optical wave-guide in a proximal end or a gripping portion of the divided portions, wherein a point at which the pressing force is applied is spaced from a point at which the retaining force is applied to the wire-like optical wave-guide.

2. A device for retaining a wire-like optical wave-guide according to claim 1, wherein at least one of said divided portions has a wire-like optical wave-guide retaining groove on its inner surface extending along the longitudinal center axis of said plug.

3. A device for retaining a wire-like optical wave-guide according to claim 1, wherein said cylindrical plug includes a base portion, said divided portions are integrally formed in one piece with said base portion and extend from said base portion, said base portion includes a peripheral wall continuous in a circumferential direction and a central hole extending along the longitudinal center axis of the cylindrical plug for accommodating the wire-like optical wave-guide.

4. A device for retaining a wire-like optical wave-guide according to claim 1, wherein said cylindrical plug is divided into a plurality of portions in the circumferential direction over the entire length thereof, i.e., said cylindrical plug so as to form a collection of a plurality of divided portions.

5. A device for retaining a wire-like optical wave-guide according to claim 1, wherein said tightening member has a tubular form, said tightening member having a substantially constant inner diameter over a first predetermined range from one end thereof, said inner diameter being reduced in a tapered fashion over another predetermined range beyond said first predetermined range, and wherein, when all the divided portions of said cylindrical plug are inserted into said tightening member from said end thereof in a contracted state until free ends of said divided portions contact said tapered portion and then the divided portions are pushed over said tapered portion, said divided portions are deformed whereby a retaining force is applied to the wire-like optical wave-guide in the gripping portion spaced from the free ends to which the pressing force is applied.

6. A device for retaining a wire-like optical wave-guide comprising:
    a cylindrical plug of an elastic material for gripping an outer peripheral surface of at least one wire-like optical wave guide, at least one end portion of said cylindrical plug, having a predetermined length, being divided into a plurality of portions on the circumference, said divided portions having an expanded form in which a distance from an axis of said plug to each of the divided portions increases in a direction toward a free end of said cylindrical plug; and
    a tightening member for pressing a vicinity of said free end of said cylindrical plug, which is in a state where the wire-like optical wave-guide is passed through said cylindrical plug along the axis of said plug so as to allow said wire-like optical wave-guide to be retained by said cylindrical plug, in a direction substantially perpendicular to the axis of said plug from an outside of the plug and thereby deforming said divided portions and causing a retaining force to be applied to the wire-like optical wave-guide in a proximal end or a gripping portion of the divided portions, which is separated from the pressing portion, and
    wherein said tightening member includes a base portion and a plurality of divided portions which extend from one end portion of said base portion, an entirety of said tightening member has a substantially cylindrical shape, said divided portions having an expanded form in which the distance from the axis of the base portion to each of the divided portions gradually increases toward free ends of said divided portions so that all the divided portions of said cylindrical plug having an expanded form can be received in the free ends thereof and so that the wire-like optical wave-guide can be passed therethrough along an axis of said tightening member, and wherein, when a pressing force is applied to all the divided portions of said tightening member from the outside thereof in a direction substantially perpendicular to the axis of said tightening member in a state where the wire-like optical wave-guide is passed through said cylindrical plug and said tightening member along the axes thereof and in a state where all the divided portions of said cylindrical plug are placed within an inner space formed by said plurality of divided portions of said tightening member, a retaining force is applied to the wire-like optical wave-guide in said gripping portion of said divided portions of said cylindrical plug.

7. A device for retaining a wire-like wave-guide according to claim 6, wherein a wall thickness of the end portion, in a vicinity of said base portion, of said plurality of divided portions of said tightening member is larger than a thickness of the other portion, and the outer surface of said end portion forms an inclined shoulder, wherein a pressurizing ring pre-fitted onto the outer surface of the base portion of the tightening member is disposed so as to be fitted onto said shoulder, and wherein said plurality of divided portions of said tightening member are contracted and pressing force is applied to all the divided portions of said tightening member in a direction substantially perpendicular to the axis thereof.

8. A device for retaining a wire-like wave-guide comprising:
- a cylindrical plug made of an elastic material divided into a plurality of divided portions on a circumference thereof at two end portions of said cylindrical plug, said divided portions extending over a predetermined length and being separated from each other by a central portion forming a base portion of said cylindrical plug, said divided portions on respective sides of said base portion respectively terminating in free ends, each of said divided portions having an expanded form in which a distance from an axis of said cylindrical plug to each of the divided portions increases in a direction toward the respective free ends; and
- a tightening member for pressing a vicinity of said free ends of said cylindrical plug, which is in a state where the wire-like optical wave-guide is passed through said cylindrical plug along the axis of said plug so as to allow said wire-like optical wave-guide to be retained by said cylindrical plug, in a direction substantially perpendicular to the axis of said cylindrical plug from an outside of the cylindrical plug and thereby deforming said divided portions to cause a retaining force to be applied to the wire-like optical wave-guide in a proximal end or a gripping portion of the divided portions, which is spaced from the pressing portion.

9. A wire-like optical wave-guide retaining assembly, the retaining assembly comprising:
- at least one wire-like optical wave-guide to be retained;
- a cylindrical plug of an elastic material for gripping an outer peripheral surface of said wire-like optical wave-guide, at least one end portion of said plug, having a predetermined length, being divided into a plurality of portions on a circumference thereof, said divided portion initially expanding outwardly in such a manner that a distance from a longitudinal center axis of said cylindrical plug to each of the divided portions gradually increases toward a free end of each of said divided portions; and
- a tightening member for pressing a vicinity of said free ends of said divided portions in a direction perpendicular to the axis of said cylindrical plug from the outside of said divided portions and thereby deforming said plurality of divided portions so that a retaining force is applied to the wire-like optical wave-guide in a proximal end or gripping portion of said divided portions spaced form the pressing portion.

10. An assembly according to claim 9, further comprising a guide tube open at one end thereof and having an end wall at the other end thereof, an end portion of said cylindrical plug remote from said free ends of said divided portions being inserted into said guide tube, a forward end portion of said wire-like optical wave-guide which is passed through said cylindrical plug is passed through an opening formed in said end wall on a longitudinal center axis of said guide tube.

* * * * *